(12) United States Patent
Meyer et al.

(10) Patent No.: US 11,192,480 B2
(45) Date of Patent: Dec. 7, 2021

(54) UPHOLSTERED PART OF A VEHICLE SEAT HAVING A FOAM-ENCAPSULATED 3D SHAPED NONWOVEN FOR REINFORCING A SIDE MEMBER

(71) Applicant: SITECH SITZTECHNIK GMBH, Wolfsburg (DE)

(72) Inventors: Nikolaus Meyer, Cremlingen (DE); Andreas Fangmann, Varrel (DE)

(73) Assignee: SITECH SITZTECHNIK GMBH, Wolfsburg (DE)

( * ) Notice: Subject to any disclaimer, the term of this patent is extended or adjusted under 35 U.S.C. 154(b) by 0 days.

(21) Appl. No.: 16/621,469

(22) PCT Filed: Jun. 14, 2018

(86) PCT No.: PCT/EP2018/065803
§ 371 (c)(1),
(2) Date: Dec. 11, 2019

(87) PCT Pub. No.: WO2018/229185
PCT Pub. Date: Dec. 20, 2018

(65) Prior Publication Data
US 2020/0171991 A1 Jun. 4, 2020

(30) Foreign Application Priority Data
Jun. 14, 2017 (DE) .................. 10 2017 113 098.5

(51) Int. Cl.
*B60N 2/70* (2006.01)
*B60N 2/90* (2018.01)
*B60N 2/68* (2006.01)

(52) U.S. Cl.
CPC ........... *B60N 2/7017* (2013.01); *B60N 2/686* (2013.01); *B60N 2/986* (2018.02)

(58) Field of Classification Search
CPC ................. Y10S 297/01; A47C 7/20
(Continued)

(56) References Cited

U.S. PATENT DOCUMENTS

| 5,615,927 A | 4/1997 | Kassai | |
| 7,661,764 B2 * | 2/2010 | Ali | B60N 2/986 |
| | | | 297/452.26 |

(Continued)

FOREIGN PATENT DOCUMENTS

| CN | 1638989 A | 7/2005 |
| CN | 102106665 A | 6/2011 |

(Continued)

OTHER PUBLICATIONS

International Search Report of PCT Application No. PCT/EP2018/065803, dated Sep. 19, 2018.

(Continued)

*Primary Examiner* — Sarah B McPartlin
(74) *Attorney, Agent, or Firm* — Pearl Cohen Zedek Latzer Baratz LLP

(57) ABSTRACT

The invention relates to an upholstered part of a vehicle seat (100), at least including a foam part (12-2) which, in a foaming process, forms a permanent connection to a prefabricated shaped nonwoven (12-1), wherein the prefabricated shaped nonwoven (12-1) forms a supporting structure for the foam part (12-2). It is provided that the prefabricated shaped nonwoven (12-1') has at least one locally situated open cavity (12-11') which at least in sections is filled with foam, so that the foam part (12-2') has a foam-embedded supporting and reinforcing structure at least in one section (11B') of the cavity (12-11').

8 Claims, 4 Drawing Sheets

(58) Field of Classification Search
USPC .............. 297/452.26, 452.27, 452.31, 452.32
See application file for complete search history.

(56) References Cited

U.S. PATENT DOCUMENTS

| | | |
|---|---|---|
| 9,138,062 B2 * | 9/2015 | Todd .................... A47C 7/74 |
| 10,875,436 B2 * | 12/2020 | Takayama .............. B60N 2/015 |
| 2003/0186044 A1 | 10/2003 | Sauniere et al. |
| 2007/0241604 A1 | 10/2007 | Saitou et al. |
| 2010/0102599 A1 | 4/2010 | Itou et al. |
| 2011/0156467 A1 | 6/2011 | Murata et al. |
| 2013/0300178 A1 | 11/2013 | Murata et al. |
| 2015/0274048 A1 | 10/2015 | Mogi et al. |
| 2016/0288681 A1 | 10/2016 | Ferretti et al. |

FOREIGN PATENT DOCUMENTS

| | | |
|---|---|---|
| CN | 104582538 A | 4/2015 |
| DE | 10 2010 011 886 A1 | 9/2011 |
| JP | H0899638 A | 4/1996 |
| JP | 2007 050133 A | 3/2007 |
| JP | 2016 150223 A | 8/2016 |
| KR | 2013 0027799 A | 3/2013 |

OTHER PUBLICATIONS

Office Action for Chinese Patent Application No. 2018800401338, dated Sep. 13, 2021.

* cited by examiner

UPHOLSTERED PART OF A VEHICLE SEAT HAVING A FOAM-ENCAPSULATED 3D SHAPED NONWOVEN FOR REINFORCING A SIDE MEMBER

CROSS-REFERENCE TO RELATED APPLICATIONS

This application is a National Phase Application of PCT International Application No. PCT/EP2018/065803, International Filing Date Jun. 14, 2018, claiming priority of German Patent Application No. 10 2017 113 098.5, filed Jun. 14, 2017, which is hereby incorporated by reference.

FIELD OF THE INVENTION

The invention relates to a vehicle seat having an upholstered part that includes a foam part which has a supporting structure in the form of a shaped nonwoven, which after a foaming operation within a show trial is fixedly connected to the foam part.

BACKGROUND OF THE INVENTION

The publication US 2016/0288681 A1 describes a vehicle seat having a lower seat structure and a raised seat back support, wherein either one of the lower seat structures or a raised seat back support is made up of a multilayer assembly. The multilayer assembly includes a flexible static layer, a flexible dynamic layer having an adjustable firmness, a so-called suspension layer formed from adjustable springs that support a flexible panel, and a frame carrier containing a protective recess within which the suspension layer is enclosed.

The publication US 2013/0300178 A1 discloses a vehicle seat having a cushion pad, a surface element, and a rigid element. A cushion support may be provided with a main portion for supporting an occupant, and a side support portion provided on a side of the main portion. The side support portion may protrude from the main portion so as to support the occupant. A surface element is provided on a surface of the cushion pad. The rigid element is provided inside the side support portion of the cushion pad. The rigid element has a higher rigidity than the cushion pad, and protrudes in the same direction in which the side support portion protrudes. The rigid element has an end portion that contacts the surface element.

In addition, a vehicle seat is known from the publication DE 10 2010 011 886 A1, having a seat part designed as a seat cushion and including side flanks, each of which has pneumatically actuatable air chambers in a cavity for adjusting the side flanks. The cavity together with the side flanks is lined with a shaped nonwoven, and the shaped nonwoven is provided with spaced-apart longitudinal slots in a surface region directly facing the air chambers. These longitudinal slots are used to ensure displacement travel during inflation or evacuation. The foam part of the seat cushion is stiffer at the edges due to the shaped nonwoven, while the foam part of the seat cushion is more elastic due to the longitudinal slots in certain areas in the shaped nonwoven.

The publications relate to the reinforcement of foam parts, wherein in particular the reinforcement of side flanks of the seat parts and/or seat back parts is in each case the primary focus of the described solutions.

SUMMARY OF THE INVENTION

The object of the invention is to provide a simple option for stabilizing the foam part of an upholstered part.

The starting point of the invention is an upholstered part of a vehicle seat, at least including a foam part which in a foaming process forms a fixed connection with a prefabricated shaped nonwoven, wherein the prefabricated shaped nonwoven forms a supporting structure for the foam part.

According to the invention, it is provided that the prefabricated shaped nonwoven has at least one locally situated open cavity that is filled with foam, at least in sections, so that the foam part, at least in a section of the cavity of the shaped nonwoven, has a supporting and reinforcing structure that is embedded in the foam.

The shaped nonwoven now advantageously forms a supporting and reinforcing structure which becomes embedded or encapsulated in the foam part during the foaming of the shaped nonwoven. For the foam encapsulation, the shaped nonwoven, at least in sections, forms the cavity, whose outer contour is adapted to the seat component to be formed in the upholstered part or in the foam part. The cavity requires at least one opening to allow the foam to penetrate into the cavity.

It is preferably provided that the supporting and reinforcing structure of the shaped nonwoven that is integrated into the foam part is situated, at least in sections, in the area of a side flank. The invention advantageously provides that the supporting and reinforcing structure is provided only in sections, for example, so that upholstered parts may be formed which, depending on the requirements, have only the supporting function in sections or the supporting and reinforcing function in sections.

As mentioned above, another advantage of the invention is that in one preferred embodiment of the invention, the supporting and reinforcing structure of the shaped nonwoven that is integrated into the foam part has a three-dimensional contour, at least in sections, that essentially corresponds to a contour of the side flank. The advantage is that reinforcement and support of the foam part, in particular the foam in the area of the side flanks, in sections is easily possible by appropriately shaping the shaped nonwoven in the desired contour.

It is preferably provided that the supporting and reinforcing structure of the shaped nonwoven that is integrated into the foam part has a U-shaped three-dimensional contour, at least in sections, that essentially corresponds to the contour of the side flank, the opening of the cavity being situated on a side opposite from the top side of the side flank. This embodiment has proven to be effective due to the fact that it is easily possible to provide the edge of the shaped nonwoven with a U-shaped board, so to speak, as the result of which at the same time, the downwardly pointing opening in the installation position of the upholstered part is formed, and the outer contour of the side flank in the interior of the foam is recreated. It is understood that the opening does not necessarily have to be oriented downwardly to ensure the penetration of the foam into the cavity. As proposed, the foam also penetrates laterally into the cavity, viewed in the longitudinal direction of the cavity or in the longitudinal direction of the side flank. It is therefore essential that the cavity has at least one opening through which the foam can penetrate into the cavity in the foaming process.

It is also advantageously provided that the supporting and reinforcing structure of the shaped nonwoven that is integrated into the foam part has at least one opening within the shell surface of the shaped nonwoven. An opening in the shell surface of the shaped nonwoven has the effect that the foam can enter into the cavity, and also that weakening of the supporting and reinforcing structure is possible. Providing one or more openings is thus an advantageous option for influencing the rigidity of the supporting and reinforcing structure. The rigidity is reduced by providing one or more openings in the shell surface of the shaped nonwoven. In addition, the rigidity may also be changed by the shape of the three-dimensional supporting and reinforcing structure. Furthermore, the material thickness of the shaped nonwoven may be changed, at least in sections, so that in this way as well, the rigidity of the supporting and reinforcing structure may be adapted if necessary. It is understood that the measures may be combined with one another.

The invention therefore relates to a vehicle seat that includes a seat part and a seat back part that have an upholstered part with the features described above.

In particular, a vehicle seat is claimed that includes an upholstered part having at least one side flank that has a foam-filled and foam-encapsulated supporting and reinforcing structure over the entire length of the side flank. The supporting and reinforcing structure is primarily formed by the variably adjustable shaped nonwoven.

The following description concerns one particular embodiment that relates to a sport vehicle seat. It is preferably provided that the upholstered part includes at least one side flank having a supporting and reinforcing structure, wherein the supporting and reinforcing structure having the locally situated open cavity accommodates a sport bracket in a first unfoamed section of the cavity of the supporting and reinforcing structure in the front area of the side flank, and accommodates foam in a second foam-embedded section of the cavity of the supporting and reinforcing structure in the rear area of the side flank. In a sport seat, the cavity that is formed takes on two functions, so to speak. In a first function the cavity is used for arranging the sport bracket. In a second function the cavity is used for arranging the foam, resulting in a contact surface of the side flank in the rear area of the side flanks that differs from the front area with regard to rigidity. The unrestricted section of the cavity advantageously adjoins the foam-embedded section. During manufacture of the upholstered part, consideration is made only within the tool for providing an unfoamed area (in the present exemplary embodiment for the sport bracket) that adjoins the restricted area, as explained in greater detail in the description. It is understood that the unfoamed section may also be kept free for other components that must be accommodated in the upholstered part, i.e., in the foam part of the upholstered part. In this regard, the described sport seat represents only one exemplary embodiment.

Unless stated otherwise in the individual case, the various embodiments of the invention described in the present patent application may advantageously be combined with one another.

The invention is explained below with reference to the associated drawings. In the figures:

DETAILED DESCRIPTION OF THE INVENTION

Figure 1:
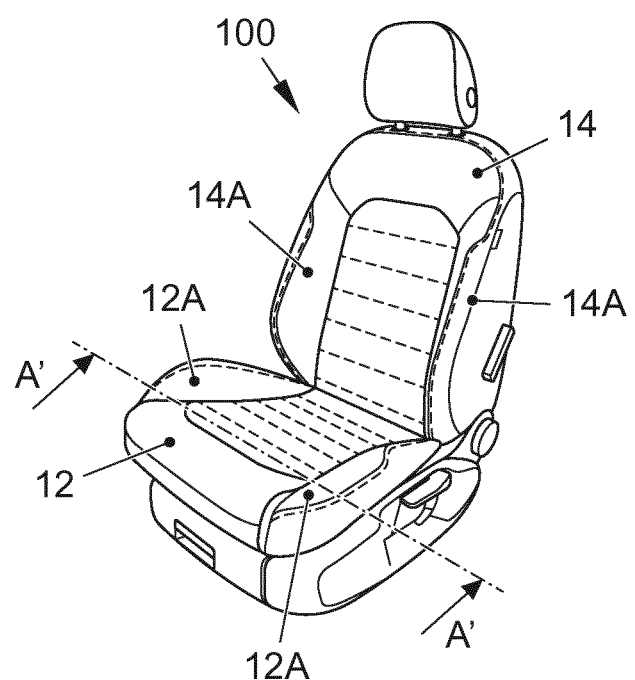
FIG. 1 shows a vehicle seat.

FIG. 1 shows a vehicle seat 100 that includes a seat part 12 and a seat back part 14. In a known manner, the seat part 12 and the seat back part 14 have side flanks, denoted by reference numerals 12A and 14A, respectively.

Figure 2A:
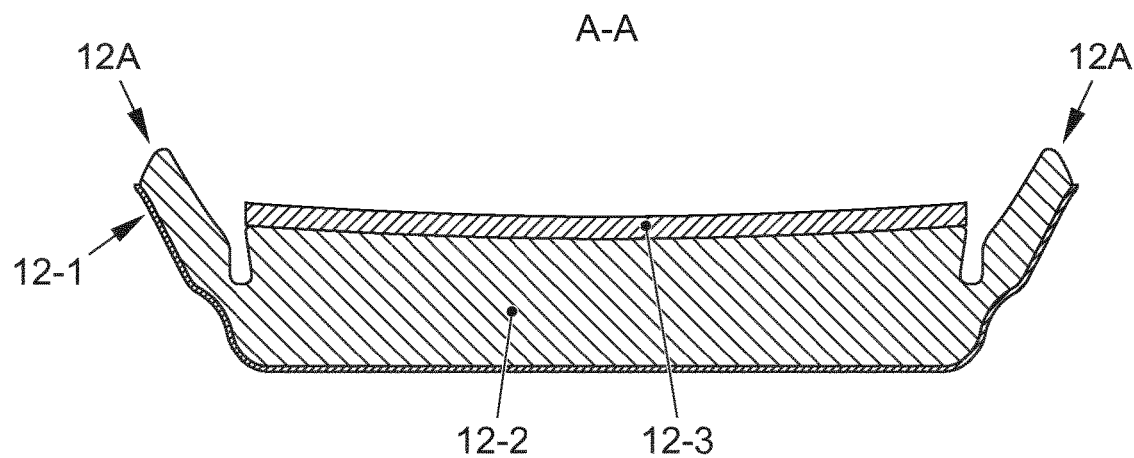
FIG. 2A shows a section A-A of a conventional seat part of a vehicle seat.
Figure 2B:
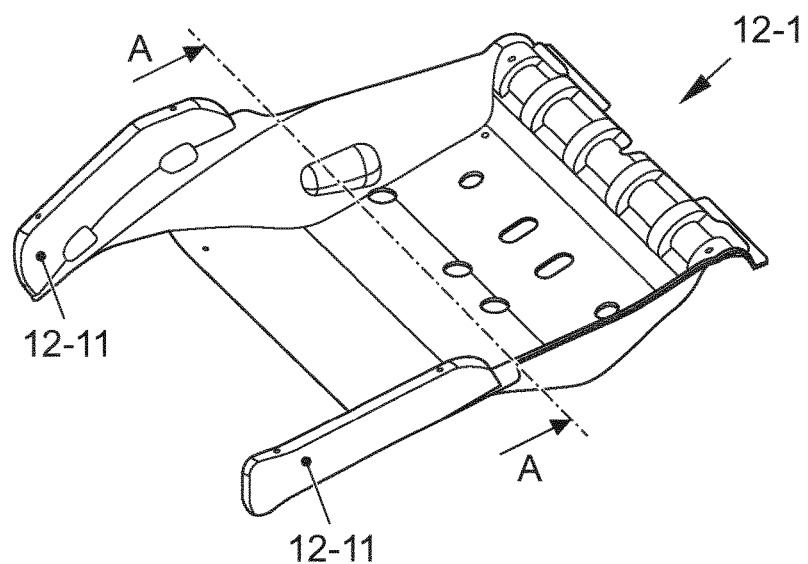
FIG. 2B shows a perspective view of a prefabricated molded part, in particular a 3D shaped nonwoven, according to FIG. 2A.

FIG. 2A shows a section A-A of a conventional seat part 12 of a vehicle seat 100. FIG. 2B depicts the section plane of section A-A according to FIG. 2A, a conventional shaped nonwoven 12-1 being shown in a perspective view in FIG. 2B.

The conventional shaped nonwoven 12-1 represents a prefabricated molded part, which due to its three-dimensional shaping is also referred to as a 3D shaped nonwoven.

According to FIG. 2A, the seat part 12 includes the 3D shaped nonwoven 12-1, a foam part 12-2, and a foam support section 12-3.

The preformed 3D shaped nonwoven 12-1 presently includes two pockets 12-11, which in the assembled state are used to accommodate sport brackets, which in so-called sport seats are situated in the front side flank area of the seat part 12. The pockets 12-11, based on the installed state of the 3D shaped nonwoven 12-1, represent cavities that are open at the bottom.

The length of the front side flank area in which the sport brackets are situated in the pockets 12-11 is approximately ⅓ the overall length of a side flank 12A.

At this time, the preformed 3D shaped nonwoven 12-1 is inserted into a foaming tool and foamed on, the foaming tool being designed in such a way that in the foaming process within the cavity of the foaming tool, the foam part 12-2 is filled with foam, whereas the pockets 12-11 are not filled with foam.

For this purpose, the tool has an insert in the area of the pockets 12-11 which ensures that the pockets 12-11 are not filled with foam.

The shaped nonwoven 12-1 is situated at the edge of the 3D shaped nonwoven 12-1 (see FIG. 2A), and is used as a supporting structure for the upholstered part, which is formed at least from the 3D shaped nonwoven 12-1 and the foam part 12-2.

Sport brackets are subsequently situated in cavities remaining in the precontoured pockets 12-11, and complete the seat part 12 during the subsequent assembly of the seat part 12.

The foam support section 12-3 illustrated in FIG. 2A is also added during assembly, and lastly, a cover, not illustrated in greater detail, is mounted on the foam part 12-2 and the foam support section 12-3, which in this embodiment variant form the upholstered part of the seat part 12 together with the 3D shaped nonwoven 12-1.

It is apparent from FIGS. 2A and 2B that the side flanks 12A or side flank foam parts 12-1, formed in the foaming process described above, are formed or foamed on within the foaming tool on the inner side of the 3D shaped nonwoven 12-1.

In other words, the conventional 3D shaped nonwoven 12-1 presently provides measures for accommodating the sport brackets, and due to its inner contour, specifies the boundary contour or supporting structure of the foam part 12-2 of the upholstered part on the seat pan side.

Previously, the 3D shaped nonwoven 12-1 has provided no three-dimensional contour for forming a contour of the side flanks 12A.

The pockets 12-11 presently situated in the 3D shaped nonwoven 12-1, between the sport brackets and the foam, are used to protect the foam from the sport brackets situated in the pockets 12-11 during assembly. It is necessary to protect the foam, since during use of the vehicle seat 100, there is a localized continuous stress on the foam situated above the sport brackets.

Proceeding from this embodiment of the vehicle seat 100, reinforcement of the side flanks 12A (analogous to the side flanks 14A in the seat back part 14) ensures that improved resilience of the foam of the foam part 12-2 is present in the rear area of the side flanks 12A.

In addition to the aspect of seating comfort, this rigidity is also important due to the fact that improved resilience of the foam of the side flanks 12A is advantageous to avoid creasing of the cover (not illustrated) situated above the foam. In particular when the cover is made of a leather material, which is the case in particular, but not exclusively, for sport seats, creasing of the leather material and an unsightly appearance of the sport seat disadvantageously occur quickly when the foam of the side flanks 12A does not have a certain minimum rigidity which largely prevents creasing.

The vehicle seat 100 presented in the figures is a sport seat, for example, which in the front area (approximately ⅔ of the overall length) of the side flanks 12 has the sport brackets in the pockets 12-11 of the 3D shaped nonwoven 12-1, and in the rear area (approximately ⅓ of the overall length) of the side flanks 12A has reinforced side flanks 12A, which previously have had a reinforced design, as necessary, in that prior to foam-embedding the 3D shaped nonwoven, i.e., prior to the foaming process in the rear area of the side flanks 12A to be filled with foam, a so-called hard foam insert is inserted, which after the foam encapsulation of the hard foam insert is integrated into the foam part 12-2.

This hard foam insert is not illustrated in the figures, since according to the present invention a different approach has been found to influence the rigidity of the side flanks 12A described by way of example, as explained below.

The components according to the invention that are changed compared to the prior art are denoted by an apostrophe (').

First, it is pointed out that the procedure according to the invention and the inventive design of the seat part 12 (analogous to the seat back part 14) are not limited to reinforcing just the rear side flank area of the side flanks 12A; instead, an entire side flank 12A or some other component, for example a backrest area of the seat back part 14 of the vehicle seat 100, is reinforced in the manner according to the invention.

Figure 3A:
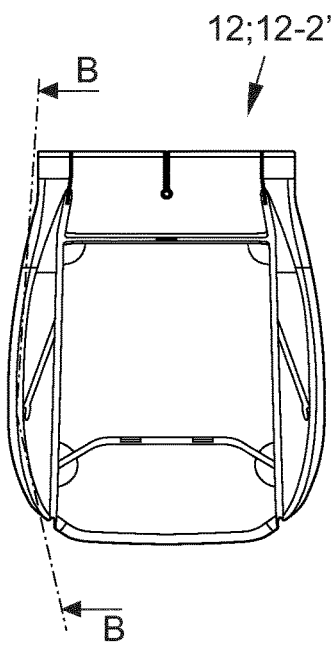
FIG. 3A shows a design representation as a top view of a vehicle seat according to the invention, with indication of a section B-B.

FIG. 3A shows a design representation as a top view of the seat part 12 of a vehicle seat 100 according to the invention, with indication of the section plane of a section B-B along a side flank 12A'. Section B-B lies in a section plane along the longitudinal extension of the side flank 12A', with the section plane intersecting the side flank 12A' in the center.

The section plane according to section B-B illustrates in a simplified depiction the inventive design of the foam part 12-2' and of the 3D shaped nonwoven 12-1', which now, in contrast to the prior art, advantageously form a supporting and reinforcing structure. The 3D shaped nonwoven 12-1' no longer has just the effect of supporting the foam part 12-2'; rather, the 3D shaped nonwoven 12-1' is now foam-encapsulated, or in other words, integrated into the foam, thereby additionally reinforcing the foam part 12-2'.

Figure 3B:
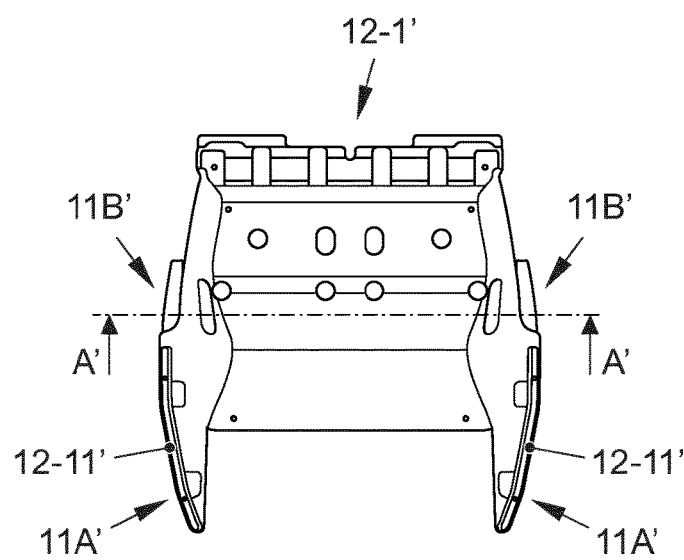
FIG. 3B shows a top view of the prefabricated molded part according to the invention with indication of a section plane of section A'-A', which is situated in the same section plane analogously to section A-A according to FIG. 2B.

FIG. 3B shows a top view of the prefabricated molded part 12-11' according to the invention, with indication of a section plane of section A'-A', transverse to section B-B, which is situated in the same section plane as section A-A according to FIG. 2B.

In the design representation, the section plane in section A'-A' is also depicted as a side view of the seat part 12 of the vehicle seat 100 according to the invention.

Figure 3C:
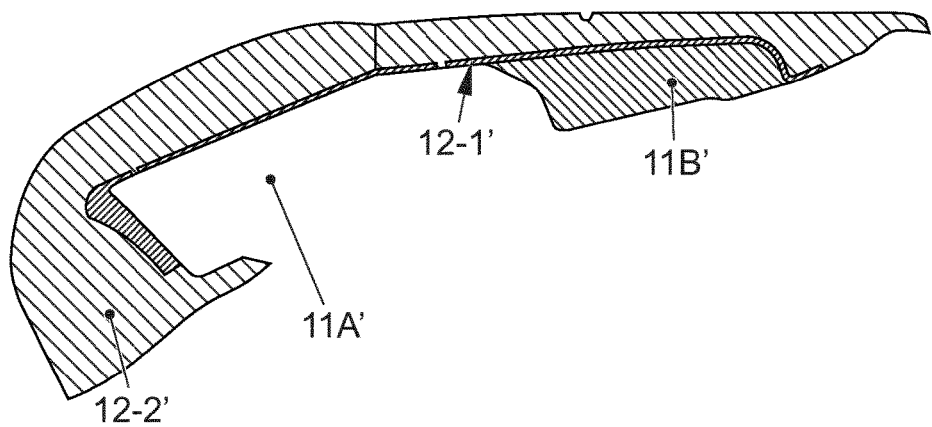
FIG. 3C shows a simplified illustration as a side view of a seat part of a vehicle seat according to the invention, with indication of a section B-B.
Figure 3D:
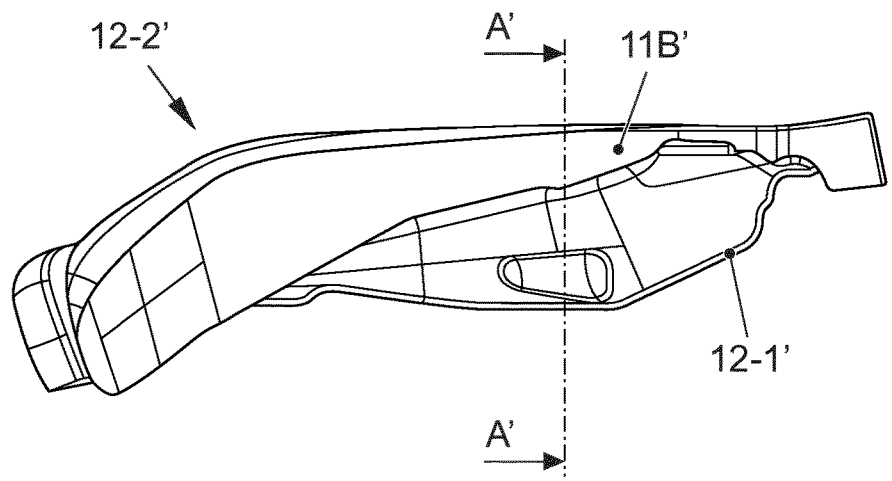
FIG. 3D shows a design representation as a side view of the seat part of the vehicle seat according to the invention, with indication of section A'-A'.
Figure 3E:
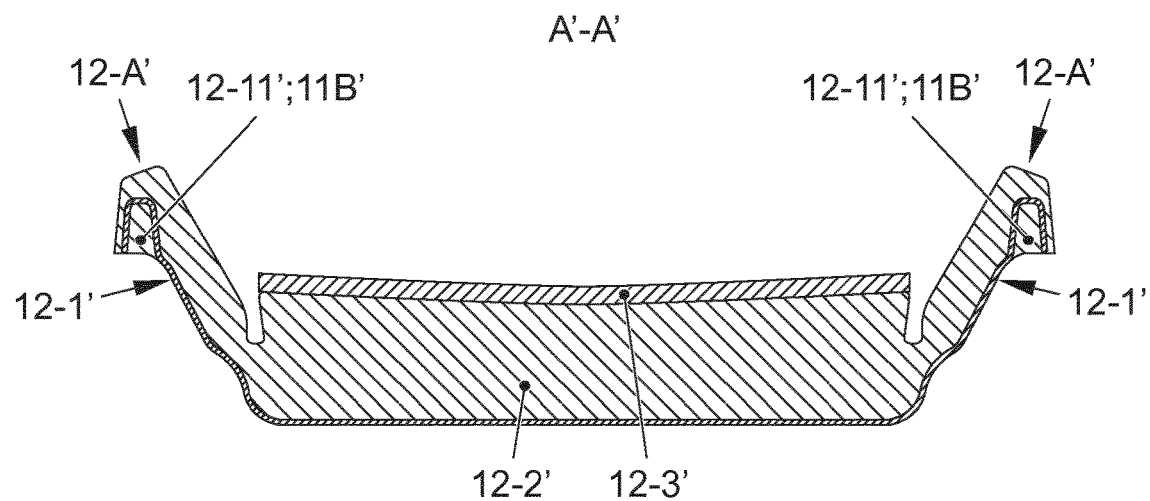
FIG. 3E shows section A'-A' of the seat part of the vehicle seat according to the invention according to FIGS. 3B and 3D.

Lastly, FIG. 3E shows a further construction plan view of section A'-A' through the seat part 12 of the vehicle seat 100 according to the invention according to FIGS. 3B and 3D.

For the following description, it is recommended that FIGS. 3A through 3E be considered together.

In the top view of the prefabricated molded part 12-11' according to FIG. 3B, it is clear that the pockets 12-11 extend over approximately ⅓ of the overall length of the side flank 12A. In other words, in the section plane according to section A'-A', a cavity is now likewise formed which is not needed for arranging the sport brackets.

For the described sport seat, it is now provided that the extended pocket 12-11' in a first section 11A' is not filled with foam in the foaming process, as previously, while the pocket 12-11' is filled with foam in a second section 11B'.

According to the invention, the preformed 3D shaped nonwoven 12-1' is inserted into a foaming tool, the foaming tool being designed in such a way that in the foaming process, the foam part 12-2' is filled with foam within the cavity of the foaming tool; the first section 11A' is not filled with foam, whereas the second section 11B' is filled with foam, so that in the second section 11B' a supporting and reinforcing structure of the side flank 12A, situated within the foam part 12-2', is formed which is specified by the outer contour of the 3D shaped nonwoven 12-1'. Analogously to the previous procedure, the tool has a corresponding insert in the first section 11A' which ensures that the pocket 12-11' in the first section 11A' is not filled with foam.

It is clear from FIG. 3C that the foam part 12-2' according to the invention has the second section 11B', which is encompassed by the outer surface of the 3D shaped nonwoven 12-1', which is most easily visible in FIG. 3E.

According to FIG. 3E, the second section 11B' of the foam part 12-2' is provided with foam on the contour formed by the inner surface of the 3D shaped nonwoven 12-1', and on the contour formed by the outer surface of the 3D shaped nonwoven 12-1', which forms the pocket-like cavity 12-11' in the second section 11B'.

FIG. 3D illustrates an external view of the foam part 12-2' according to the invention, into which the extended pocket 12-11' of the 3D shaped nonwoven 12-2 is integrated (not visible) in the second section 11B'.

It is clear from a comparison of FIGS. 2A and 3B that the side flank 12A' in the rear area now has the reinforcing structure that is formed from the 3D shaped nonwoven 12-1'.

According to the invention, for optimizing the foaming process it is provided that in the second section 11B', the 3D shaped nonwoven 12-1' has further openings within its shell surface that forms the pocket 12-11', in order to improve the entry of foam into the pocket 12-11' formed by the second section 11B' on the side facing away from the foam part 12-2', and to influence the rigidity of the side flank 12A'.

According to the invention, it is provided that the rigidity of the side flanks 12A' in the second section 11B' may be influenced by forming different three-dimensional contours of the prefabricated 3D shaped nonwoven 12-1' and/or by forming different material thicknesses.

Thus, according to the invention it is possible to design a seat part pad and/or a seat back part pad in such a way that the particular pad has at least one 3D shaped nonwoven 12-1' with three-dimensional contours which form a cavity that is filled with foam during the foaming process for the foam part 12-2'.

In this way, it is possible to adapt not only entire side flanks or side flank areas, but also other desired areas in the seat back part pad and/or a seat back part pad with regard to their rigidity. This adaptation of the rigidity is advantageously possible without, for example, having to use a different foam for these areas in order to adapt the rigidity. Adapting the contour of the 3D shaped nonwoven 12-1' and of the tool does not require extensive measures for mass production with a high production volume.

LIST OF REFERENCE NUMERALS 100 vehicle seat
12 seat part
12-3 foam support section
14 seat back part
Prior Art
12A side flank
12-1 shaped nonwoven, 3D shaped nonwoven as a supporting structure
12-11 cavity, pocket (unfoamed)
12-2 foam part
Invention
12A' side flank
12-1' shaped nonwoven, 3D shaped nonwoven as a supporting and reinforcing structure
12-11' cavity, pocket
11A' first section of the pocket
11B' second section of the pocket (foam-embedded)
12-2' foam part

The invention claimed is:

1. A side flank of a vehicle seat, comprising:
a foam part which, in a foaming process, forms a fixed connection with a prefabricated shaped nonwoven that forms a supporting structure for the foam part,
wherein the prefabricated shaped nonwoven has at least one open cavity that is filled with foam, at least in sections, so that the foam part, at least in a section of the open cavity of the shaped nonwoven, has a supporting and reinforcing structure that is embedded in the foam, and
wherein the open cavity:
accommodates a sport bracket in a first unfoamed section thereof in a front area of the side flank, and
accommodates foam in a second foam-embedded section thereof in a rear area of the side flank.

2. The side flank according to claim 1, wherein the supporting and reinforcing structure of the shaped nonwoven that is integrated into the foam part is situated, at least in sections, in an area of the side flank.

3. The side flank according to claim 2, wherein the supporting and reinforcing structure of the shaped nonwoven that is integrated into the foam part has a three-dimensional contour, at least in sections, that essentially corresponds to a contour of the side flank.

4. The side flank according to claim 3, wherein the supporting and reinforcing structure of the shaped nonwoven that is integrated into the foam part has a U-shaped three-dimensional contour, at least in sections, that essentially corresponds to the contour of the side flank, and wherein an opening of the cavity is situated on a side opposite from a top side of the side flank.

5. The side flank according to claim 1, wherein the supporting and reinforcing structure of the shaped nonwoven that is integrated into the foam part has at least one opening within a shell surface of the shaped nonwoven.

6. A vehicle seat, comprising a seat part and a seat back part which have side flank according to claim 1.

7. A vehicle seat according to claim 6, wherein the upholstered part includes at least one side flank, which has, over the entire length thereof, a foam-filled supporting and reinforcing structure of the shaped nonwoven that is integrated into the foam part.

8. A vehicle seat comprising:
a seat part and a seat back part which have an upholstered part comprising:
a prefabricated shaped nonwoven with at least one side flank, having a supporting and reinforcing structure,
a foam part which, in a foaming process, forms a fixed connection with the prefabricated shaped nonwoven,
wherein the prefabricated shaped nonwoven has at least one open cavity that is filled with foam, at least in sections, so that the foam part, at least in a section of the open cavity of the shaped nonwoven, has the supporting and reinforcing structure embedded in the foam, and
wherein the open cavity:
accommodates a sport bracket in a first unfoamed section of the cavity of the supporting and reinforcing structure in a front area of the side flank, and
accommodates foam in a second foam-embedded section of the cavity of the supporting and reinforcing structure in a rear area of the side flank.

* * * * *